March 17, 1964 S. B. SMITH 3,125,290
ORDER QUANTITY CALCULATOR
Filed Jan. 8, 1963
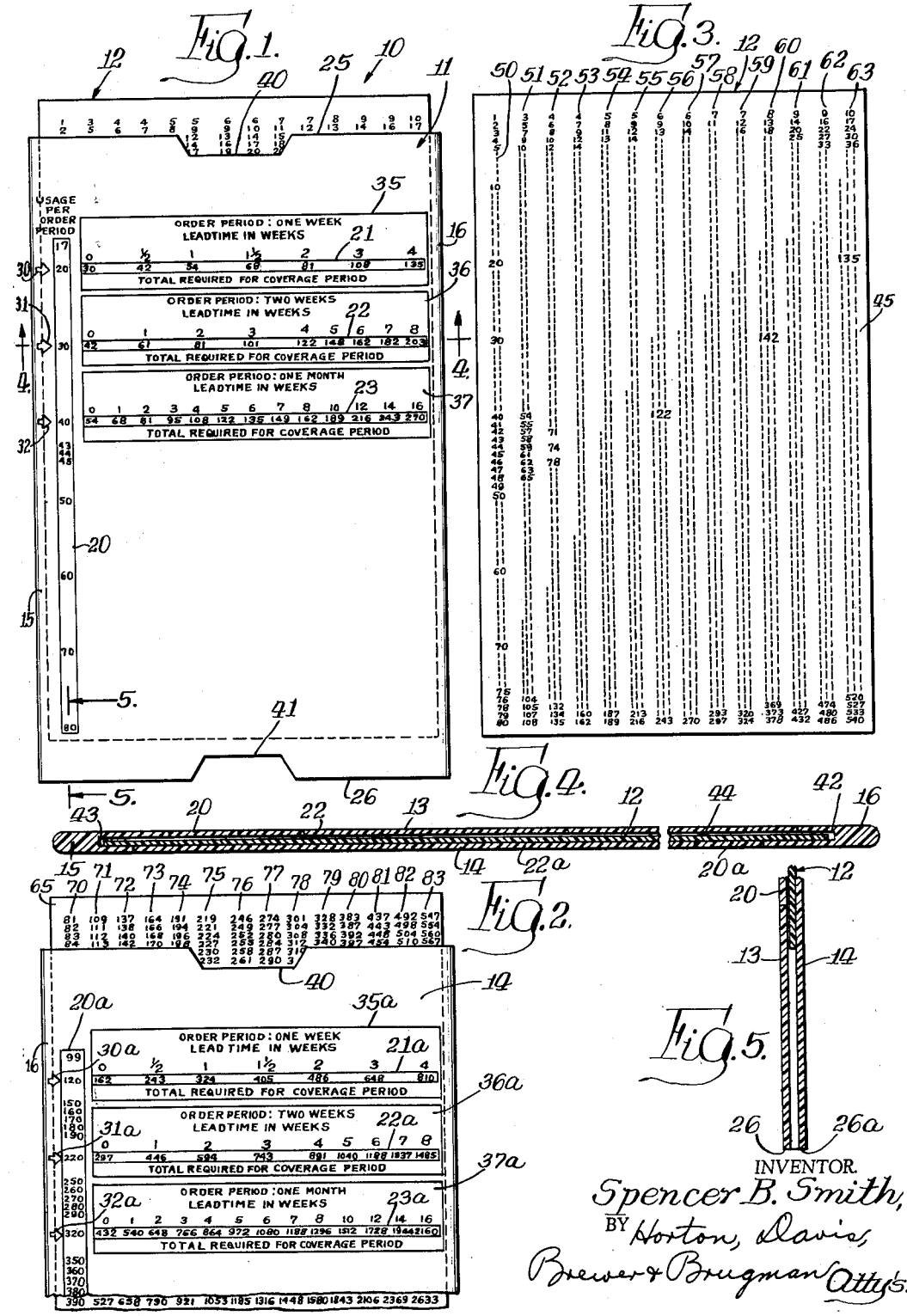
INVENTOR.
Spencer B. Smith,
BY Horton, Davis,
Brewer & Brugman Attys.

United States Patent Office 3,125,290
Patented Mar. 17, 1964

3,125,290
ORDER QUANTITY CALCULATOR
Spencer B. Smith, 402 Lee St., Evanston, Ill.
Filed Jan. 8, 1963, Ser. No. 250,099
4 Claims. (Cl. 235—89)

This invention relates to calculating devices and, more particularly, to calculating devices for computing quantities of items to be ordered for replenishing stock or inventory when such items normally are ordered on a predetermined periodic basis.

Many merchandising control systems, particularly those used in retail, wholesale and manufacturing levels, are designed to control the flow of merchandise or items of manufacture by comparing such factors as the quantity of items on hand against the quantities thereof disposed of during a selected period of time and periodically, usually at regularly selected intervals or periods, replenishing the disposed of stock or number of items so as to maintain a sufficient inventory to meet normal expected demand. In determining the quantities of inventory to keep on hand, a certain safety allowance is included and demand based on experience of past sales or disposal of the items is also taken into account. Usually some attempt is additionally made to contemplate the probability of demand and disposal for the future, particularly for the interval of time between replenishing or ordering periods. In a typical procedure based on what is herein termed a "periodic order system," the procedure of placing an order for replenishing desired quantities of items involves substantially the following steps.

An inventory count of the merchandise on hand is first determined. To the count of the number of items on hand at the last order placement is added the quantities received, produced or added to the inventory since the last order period. From that total quantity, the current number of items on hand is deducted and the result indicates the usage or disposal of items during the period since the last order was placed. This is termed a "usage factor" and such is recorded so that by surveying the usage records for the last and other previous order periods, an estimated average usage or quantity of items disposed of per order period is determined. Since there is a certain time delay called "lead time" between placing an order for replacement and the time items are actually received and added to the inventory, this factor is also taken into account and added to the normal order period. That is to say, the total elapsed time between successive replacement orders which, as above pointed out, is usually determined at a fixed, predetermined interval, called order time, and lead time is added to that normal order period time. The sum of lead time and normal order period time is referred to as the "coverage period," preferably expressed in weeks. The coverage period is then multiplied by the estimated average usage or disposal of items for the order period and divided by the "order period" to arrive at the expected usage or number of items to be disposed of during the "coverage period." For safety's sake, to assure sufficient numbers or quantities of items to cover eventual and probable sales during the coverage period, a certain safety allowance, usually based on past experience of sales, is added to the calculated or expected usage during the coverage period to arrive at an estimated total desired quantity to meet demand during the coverage period. However, since there are a certain number of items on hand or in stock, the current inventory therefor is deducted from this total quantity and the result is the quantity of items to be ordered.

As will be readily appreciated from the foregoing, the replenishment and control of stock under the above-indicated "periodic order system" requires numerous calculations and computations, all of which are time-consuming and susceptible to human error. The calculating device of the present invention is designed primarily to perform the steps of the above-outlined procedure involving the addition of the normal order period time to the lead time so as to arirve at the "coverage period"; multiply the coverage period by the estimated average usage per order period and divide that product by the order period to arrive at "expected usage during the coverage period" and to add to the latter calculation a certain number or items representative of a "safety allowance" in arriving at a calculated total quantity of items required for the coverage period.

In order to indicate roughly the magnitude of time and labor savings effected by the present invention, in a typical retail store, for example, having some 60,000 items in stock, if such items are re-ordered for replacement every two weeks, the foregoing indicated calculations required to perform this task for one year would constitute some 1,560,000 calculations. Further, since such ordering of the items is generally carried out by persons having abilities and traits not necessarily encompassing an outstanding mathematical aptitude, the advantages of the present invention in performing a substantial number of such calculations is readily apparent.

Generally speaking, the present calculator is intended to substantially reduce the number of numerical errors in quantity ordering under a periodic order system, thereby ultimately reducing the number of lost sales due to failure to have sufficient inventory on hand. This also results in minimizing excess inventory caused by ordering quantities in excess of the number required to meet sales demand.

In brief, one form of the present invention comprises a calculating device comprising an elongated envelope, open at its opposite ends and adapted to receive in the spacing between the enclosing walls thereof, a slidable card or rigid table member on which are set out a series of scales made up of a series of tabulations constituting quantities to be ordered to meet expected demand according to certain mathematical parameters and premises embodied in the present invention. The table card member is slidable longitudinally relative to the encompassing walls of the envelope member, while the latter is provided, in the walls which confront the tabulations on the table card, with index means and windows or openings disposed in a designated manner and positioned to achieve the desired calculations by visually presenting the proper indicia from the table card opposite a selected window or opening of the envelope. Thus, the calculator makes directly available to the user a visual presentation of necessary item quantity information. The jacket or envelope member is further equipped with the aforementioned window openings and indicia indicator means for both or opposite sides of the table card member; the latter bearing on its opposite faces, i.e., those confronted by the superimposing walls of the envelope or jacket, tabulated calculations or indicia in the form of a plurality of split or separated scales, with one portion of each scale running from near the upper or top edge of one face of the table card to adjacent the bottom edge thereof and continuing in a like fashion on the opposite side of the table card. Thus, the tabulated calculations on the table card are split or divided into two scale sets, while the indicia indicating means of the envelope or jacket member cooperate therewith. In this regard, it is to be noted that the calculations and operation of the device observable from one side or face thereof are independent of corresponding calculations accomplished from the opposite face thereof.

The main object of this invention is to provide a new and improved device for calculating the total quantities of items to be ordered or replenished to inventory when the ordering is carried out on regular periodic basis.

A further object of this invention is to provide a new and improved calculating device, as aforesaid, which is time and labor saving and simple to operate.

A further important object of this invention is to provide a new and improved device for calculating quantities of merchandise, items and the like, ordered at regular periodic intervals which greatly reduces the number of calculations required to be made by operating personnel.

Still another object of this invention is to provide a new and improved order quantity calculator for periodic ordering systems which includes and takes into account in its calculations and operation the experience of past sales or consumpiton of items, the probability of future sales or consumption of items, as well as certain time delay factors.

The above and further objects, features and advantages of this invention will be recognized from the following description of an exemplary embodiment of the present invention depicted in the accompanying drawings and hereinafter to be described.

In the drawings:

FIGURE 1 is a front elevational view of a calculating device embodying the present invention;

FIGURE 2 is a partial rear elevational view of the device set forth in FIGURE 1, illustrating the reverse side thereof;

FIGURE 3 is a front elevational view of the table card member partially seen in FIGURES 1 and 2, illustrating the arrangement of tabulated scales thereon;

FIGURE 4 is an enlarged, cross-sectional view taken substantially at vantage line 4—4 of FIGURE 1 and looking in the direction of the arrows thereon; and FIGURE 5 is another partial, enlarged, cross-sectional view taken substantially at vantage line 5—5 of FIGURE 1 and looking in the direction of the arrows thereon.

Turning now to the features of the present invention illustrated in the drawings, it will be recognized from FIGURE 1 that the calculator device, indicated generally by numeral 10 therein, comprises a generally elongated and rectangular shaped envelope or jacket 11 open at its opposite ends and receptive of a table card 12, the latter comprising a generally rectangular planar member slidably disposed between front planar wall 13 and back planar wall 14 of the envelope 11 (see FIGURES 4 and 5). The walls 13 and 14 are integrally formed with and interjoined by marginal wall portions 15 and 16 of the envelope member, as best shown in FIGURE 4 of the drawings. Preferably, the envelope member 11 is constructed from a suitable lightweight, rigid material, such as plastic, preferably opaque, except for designated transparent indicia areas 20, 21, 22 and 23 in its front wall 13 and corresponding indicia areas 20a, 21a, 22a and 23a in its back wall. To accomplish this, the indicia areas may be formed, for example, by screen printing or like coating processes, by which the exterior faces of walls 13 and 14, made of transparent material, are coated with paint, ink or a like suitable opaque substance, leaving the indicia areas transparent. It is also fully contemplated that such indicia areas may alternatively constitute cut-out openings formed through the opaque wall members 13 and 14 of the envelope member 11.

It will further be noted, considering the indicia areas 20–23 in wall 13 as set forth in FIGURE 1 that the indicia area designated 20 is depicted as a generally elongated rectangular area disposed parallel and adjacent the left-hand marginal wall portion 15 of the envelope member. The indicia areas 21, 22 and 23, on the other hand, while also elongate and rectangular, are disposed transversely of area 20 intermediate the upper and lower ends 25 and 26, respectively, of the envelope member to extend substantially transversely of the major longitudinal axis of the envelope member and substantially between the marginal portions 15 and 16 thereof. Further, the indicia areas 21, 22 and 23 are parallel and spaced from one another at intervals selected for operational convenience. The indicia areas 20a–23a on the reverse side of the envelope 11 are similarly formed and disposed so that the elongated area 20a parallels marginal wall 16 of the envelope, with the other indicia areas 21a, 22a and 23a disposed transversely thereof and in registered alignment with the corresponding openings or areas 20–23 formed on wall 13 of the envelope member.

In addition to the indicia areas 20–23 and 20a–23a hereinabove described, index means, such as arrow indicators 30, 31 and 32 on front wall 13 of the envelope and corresponding indicator arrows 30a, 31a and 32a on wall 14 of the envelope are provided. Each of such indicator arrows is disposed laterally outwardly of the adjacent vertically disposed indicia area 20 or 20a, as the case may be, so as to point opposite one of each of the indicia areas 21–23 or 21a–23a. For example, arrow 30 lies laterally outwardly of indicia area 20 in front wall 13 of the envelope and opposite the adjacent end of the indicia area 21. In a like manner, arrow 31 lies opposite indicia area 22, and arrow 32 lies opposite indicia area 23. A similar arrangement is carried out between index arrows 30a–32a and their correspondingly related indicia areas 21a–23a in the back wall 14 of the envelope member.

Also disposed on the major planar walls 13 and 14 of the envelope member are lead time scales for specified order periods, such being indicated in weekly time periods and located within rectangular order period areas designated generally 35, 36 and 37 on wall 13 and areas 35a, 36a and 37a on wall 14. Rectangular area 35 embraces the indicia area 21, and a lead time scale in 0, ½, 1, 1½, 2, 3 and 4 week indices runs along the upper margin of area 21. In a like fashion, area 36 embraces indicia area 22 and area 37 embraces indicia area 23. Similarly, areas 35a, 36a and 37a are respectively associated and embrace within their boundaries the indicia areas 21a, 22a and 23a, respectively, on the reverse side of the calculator. It will be noted that spaced along the length of each of the several indicia areas are a series of numbers indicating lead time periods in weeks, these comprising plural lead time scales. Each of such lead time intervals or indices, expressed in weeks, superposes or lies opposite a scale of calculated indicia or figures on the table card disposed between the walls 13 and 14 of the envelope and each such lead time scale is related to a selected order period interval, such as one week within area 35. In a similar fashion, area 36 designates an order period of two weeks, as labelled in FIGURE 1, and a lead time scale having nine designated weekly intervals is disposed along indicia area 22 therewithin. Area 36, which embraces indicia area 23 on the front face or wall 13 of the envelope, indicates an order period of one month and includes a lead time scale having numerical designations for thirteen weekly lead time intervals, as designated in FIGURE 1. While it will be appreciated that all of the indicia areas 21, 22 and 23 are of the same length, the number of lead time intervals designated in the several scales therealong differ rather widely as above described.

In a like manner, the areas 35a–37a on the reverse side of the calculator, or, that is, on wall 14 of the envelope 11 are respectively labelled, as shown in FIGURE 2 of the drawings, to indicate order periods of one week, two weeks and one month, with lead time scales associated with the respectively related indicia areas 21a, 22a and 23a corresponding to the lead time scale intervals set out in the previously described indicia areas 21, 22 and 23. In other words, the order period or area 35 on wall 13 of the envelope and the lead time scale designated therewithin find a correspondingly same order period and lead time interval scale designation within area 35a located on the reverse or rear wall 14 of the envelope. This pattern or corresponding order period areas and lead time scales is, as will be observed from FIGURES 1 and 2 of the drawings, carried forth with respect to corresponding order period areas 36 and 36a and 37 and 37a.

In toto, the lead time periods designated in the several areas 35, 36 and 37 constitute lead time scale means disrupted into three sections, arithmetically related to the associated order periods of one week, two weeks and one month. A corresponding system and programming is followed on the reverse side of the calculator. It is further to be observed and understood that the lead time scales cooperate with the various scales of computations set forth on the sliding card table member 12 as will be discussed presently hereinafter.

In addition to the foregoing, the envelope walls 13 and 14 conveniently bear cut-out portions 40 and 41 located substantially midway of the lateral dimension of the envelope member and formed inwardly of its top and bottom edges 25 and 26, respectively. These cut-out areas are provided to assist the operator in manually engaging the slidable table card 12 so that a portion of the latter may always be available to the operator for slidably manipulating the table card within the envelope member in operation of the calculator device 10.

As best illustrated in FIGURE 3, the table card 12 comprises a substantially rectangular planar member, usually of cardboard, plastic or a like stiff material, adapted to fit substantially coextensively between the top and bottom walls of the envelope member 11, with the lateral dimension for the card member being just slightly less than the spacing between the marginal wall portions 15 and 16 of the envelope member to provide clearance. Likewise, the table card is slightly thinner than the spacing between the front and back walls of the envelope to provide additional clearance for sliding movement of the table card. The clearance of the table between the marginal portions 15 and 16 is indicated at areas 42 and 43 in FIGURE 4, while its clearance from the planar walls 13 and 14 of the envelope is designated at space 44.

As will be observed from FIGURE 3 in particular, face 45 of the sliding card member 12 is imprinted with a plurality of vertically extending columns of numbers constituting scale means which will now be described. The first column inwardly of the left marginal edge of the slide card (FIGURE 3), is designated generally by numeral 50, and such comprises a numerical sequence 1 through 80. This scale means is hereinafter termed a "usage scale" and such designates the number of items used or disposed of during a normal selected order period. It will be observed in the particular embodiment and example of the calculating device illustrated that such order periods for which the items indicated by scale means 50 pertain have been selected as one week, two weeks and one month, as designated in the order period areas 35, 36 and 37.

To the right of scale 50 in FIGURE 3 in parallel spaced relation appear a plurality of additional vertical columns of computations constituting additional scale means designated 51 through 63. The indicia constituting the several scale means 51–63 comprise numerical groups computed according to certain mathematical parameters as will be described in detail presently. Basically, however, each of the scale means 51–63 includes a number group set opposite each usage item indicated in the usage scale 50. Therefore, in the illustrated embodiment, each of the columns of figures in the scale means 51–63 includes eighty numerical groups. Further, the numerical groups in such scale means 51–63 constitute mathematical computations indicative of the total quantities of items required to meet demand for a selected coverage period according to this invention. It will also be observed that the several lead time scales associated with the order period areas cooperate with the scale means 51–63 to evolve desired computations of quantities of items as will be discussed more fully hereinafter.

In a like manner, the reverse side or face 65 of the sliding table card 12 includes an additional plurality of columnar scale means corresponding to the scale means 50–63 as above described; such additional scale means being indicated by numerals 70–83 in FIGURE 2. While the usage scale means 50 above described constituted a numerical sequence of digits 1 through 80, the corresponding scale means 70 on the reverse side of the table card continues such numerical sequence only through numbers 81–100. Thereafter, the numbers indicate usage quantities at regular ten-unit intervals, largely for the sake of convenience to meet normal practice as dictated by experience. The remaining scale means 71–83 on the reverse side of the table card again constitute, as do the scale means 51–63 on the front side of the table card, mathematical computations indicative of item quantities.

Having thus described the elemental portions and make-up of one type of calculating device embodying the concepts and teachings of the present invention, the derivation of the several scale means utilized therein, as well as the use and operation thereof, will now be described in detail.

In order to simplify the description, several terms will first be defined as follows:

*Order period* refers to the normal predetermined period of time, expressed in weeks, between placing successive orders under a periodic ordering system.

*Lead time* refers to the period of time between placing an order for replacement items and the time at which such items are received, again expressed in weeks.

*Coverage period* designates the sum total of the order period time and the lead time, expressed in weeks.

*Expected usage* refers to the most likely usage, demand or consumption of items during the coverage period, generally computed as the average usage per order period, based on past experience, expressed in number of items per week and then multiplied by the number of weeks in the coverage period.

*Safety allowance* constitutes additional merchandise or items made available over and above the expected usage, as above defined, to provide for fluctuations of demand in excess of expected usage.

*Total required* refers to the number of items equal to the sum of the expected usage plus the safety allowance.

*Order quantity* refers to the total number of items required less the quantity of items on hand and number of items already on order.

As previously stated, the calculating device of this invention is designed to add the order period time and lead time together to obtain the coverage period in weeks. The calculator also serves to multiply the coverage period by the estimated usage per order period and divide that product by the order period to arrive at the expected usage during the coverage period. In addition, the calculator of this invention adds the safety allowance to the expected usage to obtain the total required; such total required quantities being set out in the several tabulated scales of computations 51–63 and 71–83. The accomplishment of each of the above functions will be described in detail.

The addition of the order period and lead time constitutes a straightforward arithmetic function and such is accomplished conveniently and visually by merely reading the computations opposite the lead time indicia designated by the lead time scales disposed within each of the order period boxes or areas such as areas 35–37 and 35a–37a on the opposite faces of the envelope. For example, in a situation wherein the normal order period is one week and the lead time period is two weeks, the sum total thereof is arrived at by selecting the indicia marking 2 on the lead time scale within the one week order period area 35 on the front face of the envelope member. In a like manner, additions of lead time to order periods of two weeks or one month are achieved by directly reading the appropriate lead time scale indicia within the two week and one month order period areas 36 and 37. The order period and lead time addition is carried out in a corresponding fashion on the reverse side of the calculator, as indicated by the order period areas 35a–37a and the lead time scales disposed respectively therewithin.

The multiplication of coverage time by the estimated average usage per order period and the division of that product by the order period to arrive at the expected usage during the coverage period is also a straight arithmetic function and such is carried out in a direct visual fashion by the operator. From past experience, usually based on average usage of previous order periods, the operator may quickly determine a best estimated usage per order period. This factor is indicated by the item numbers set out on scales 50 and 70 of the table card 12. The operator places the determined usage per order period quantity of such scales 50 or 70 opposite the proper index arrow, such as arrows 30–32 or 30a–32a, according to a selected order period, by appropriately sliding the table card relative to the envelope. The determined lead time index is then selected from the lead time scale for the selected order period area, and the foregoing computation for expected usage during the coverage period is read from the calculated information on one of the scales 50–63 or 70–83 of the table card, opposite the selected lead time scale index. No multiplication or division on behalf of the operator is required; such computation being included in the answers provided by the tabulated information of the several total quantity scales set out on the table card. In addition to the immediately above discussed division and multiplication computations for arriving at the expected usage during the coverage period, the tabulated information of the scales 51–63 and 71–83 also includes a minimum safety allowance, or, that is, an additional number of items necessary to provide for fluctuations of demand over and above the expected usage during the coverage period. This factor in the computation of the tabulated information for scales 51–63 and 71–83 is based in part on statistical theory and in part on experience, as will now be explained.

In determining expected total usage for coverage period, the safety allowance is based on statistical theory of probability according to the Poisson Theory of Distribution, which is fully set out in Poisson's Exponential Binomial Limit, by E. C. Molina, D. Van Nostrand Co., Princeton, New Jersey, 1942. Briefly, however, the same may be expressed as follows:

$$P(x) = \frac{e^{-m}m^x}{x!}$$

where $n$ = number of trials
$p$ = probability of success in a trial
$e$ = base of natural logarithms
$m = np$
$x$ = number of successes
$P(x)$ = probability of exactly $x$ successes This relationship holds true where $n$ is large and $p$ is small, so that in a retail store, for example, where there are a large number of potential customers ($n$) for a given item, but a small probability ($p$) that any one customer will buy that item during a specified period, it should be expected that the number of sales of the item per order period would be described according to Poisson distribution $P(x)$ as defined in the above formula. This expectation has been adopted in the total quantity calculations of the present invention as the theoretical basis for using Poisson distribution and experience has shown that results thereby are satisfactory. As will be discussed more fully hereinafter, such distribution factor holds true up to forty items of usage, while providing a requisite safety allowance of 35% or greater. Such calculations form the basis for deriving the total quantity scales 51–63 through expected usage of forty items.

The user of this calculator, therefore, should expect to lose sales by being out of stock on an average of only once for every 52 order periods. Thus, if orders are placed weekly, the user should expect to lose sales by being out of stock only once every 52 weeks, or if the order periods are two weeks, such probability will occur only once every two years. Still further, if the selected order period is monthly, then the probability of being out of stock will be only once every 4⅓ years. Since it is usually the case that an additional unit or item may be carried in stock from one to five years at a cost equal to the profit foregone when the sale of an item is lost, the ratio of one chance in 52 as the controlling probability factor has been selected as a practical limit herein.

In using Poisson distribution for valuations of expected demand (D), results indicate a progressively smaller safety allowance expressed in terms of percentage of expected use as the expected demand increases. Experience shows that a lower limit should reasonably be placed on the safety allowance at somewhere in the neighborhood of 35%, thus giving an over-allowance of 35%. Therefore, the calculator of the present invention also utilizes this percentage as the lower limit for the safety allowance.

According to Poisson distribution, with a 1/52 ratio of probability of demand exceeding inventory, a safety allowance greater than the desired 35% for expected demand is produced whenever expected demand is less than forty items and is equal to 35% when expected demand equals forty items. Thus, Poisson distribution for forty items or less satisfies the selected 35% safety allowance limit.

However, when expected demand is greater than forty items, the safety allowance is less than 35% by Poisson distribution. Therefore, the present calculator adopts the basis of a straight 35% safety allowance for expected demand greater than forty items, and this may be expressed by the following formula:

$$R = 1.35D$$

where $R$ = total required for the coverage period
$D$ = the expected demand or usage for the coverage period This latter expression then indicates the basis for calculating the total quantities (R), indicated on the several scales 51–63 and 71–83, for all items exceeding an expected usage of forty items.

On the other hand, the calculations for the total quantities (R) to be ordered when the expected usage is forty or less is expressed by Poisson distribution according to the formula:

$$R = Q$$

where Q is established by utilizing the Poisson distribution formula set out above so as to insure the probability of 1/52, thusly:

$$\sum_{x=Q+1}^{\infty} \frac{e^{-D}D^x}{x!} = 1/52$$

This expression is then utilized to solve for values of Q wherein the relationship sums up the probability and establishes values of Q so that the probability of having an expected demand (D) exceeding inventory during a coverage period will be only one chance out of 52.

From the foregoing, it will be understood that the present calculator thus establishes the total quantities of items to be ordered for selected coverage periods under a periodic ordering system which includes a safety factor or allowance of 35% for all values of D or expected usage during a selected coverage period of forty or more items and provides a safety allowance in excess of 35% for all values of D of 39 items or less. The selection of order periods, lead times and the range or usage per order period, exemplified in the herein illustrated and disclosed embodiment of this invention, while serving to define an example of the same, is by no means to be considered as limiting the present invention to the illustrated and described example; such having been selected to cover replacements for a normal range of typical applications. In this regard, it will be appreciated that an illustration and description of the present invention to cover every conceivable requirement of usage would be prohibitive and would not otherwise serve to exemplify the concepts and novel aspects of this invention.

In order to illustrate a typical operation utilizing the calculating device herein illustrated and described, let it be considered that an item under a periodic order system is normally ordered on a basis of once a week and that the normal expected usage per order period, based on past experience or average usages during previous order periods, is determined to be twenty items per week. Let it further be assumed that the lead time, or, that is, the length of time normally experienced between placing the order and receiving the merchandise or items amounts to four weeks. The operator of this calculator will then proceed in the following manner.

The sliding table 12 is moved within the jacket or envelope 11 until the numeral 20 on scale 50 appears opposite index marker 30 which is associated with the one week order period area 35 on the front face 13 of the envelope. The lead time of four weeks on the lead time scale indexed along the area 21 is then observed by the operator and immediately therebelow the total quantity 135 is read from the underdisposed scale 63 on the table card 12. Let it be assumed further that 100 of such items are now on hand in stock or inventory. Therefore, the quantity to be ordered amounts to 135 less the quantity on hand, 100, which equals a quantity of 35 items. By placing the order for the 35 items, the operator will be assured that his stock will be replaced with at least a 35% safety factor.

As a further example, assuming that an item is ordered every two weeks and that the lead time is five weeks, while usage per order period, or every two weeks, is 30 items. As illustrated in FIGURE 1 of the drawings, the operator under this set of facts places the item number 30 on scale 50 opposite the index arrow 31 and reads on the lead time index scale opposite the number 5, indicating a five-week lead time, a total quantity of 142 from scale 60, which appears in the window or area 22 adjacent the number 5. This total quantity of 142 indicates the total required for the coverage period and assuming that there are 40 items on hand or in stock, the quantity to be ordered would amount to 142 less 40, or 102 items.

As a still further example, assume that an item is ordered regularly once a month and that the lead time is five weeks, while the usage per order period is 40 per month. Again, as shown in FIGURE 1 of the drawings, the operator places the numeral 40 of scale 50 opposite the index marker 32 and reads opposite the lead time index of five weeks in order period area 37 the total quantity 122 items from scale 56 of the underdisposed table card. Then by subtracting the quantity on hand from the total quantity required for the coverage period, the operator determines the quantity to be ordered. For example, if 100 items are on hand, he subtracts 100 from 122 and orders 22 items.

As a still further illustration, turning now to the reverse side of the calculator as illustrated in FIGURE 2 of the drawings, assume that an item is regularly ordered once a month and that the lead time is six weeks, while normal usage for the order period is 318 per month. Rounding out the usage quantity to 320, the latter figure from scale 70 is placed opposite the index marker 32a and under the lead time scale index number 6, indicating a six week lead time, the operator observes from scale 77 on the table card the calculated quantity of 1,080 items required for the coverage period. Assuming that 400 items are on hand or in inventory, the latter is subtracted from the 1,080 items required for the coverage period, leaving a total of 680 items to be ordered.

From the foregoing, it is believed that those familiar with the art will readily recognize and appreciate the unique features and advantages of the present invention, as well as the novel aspects thereof which serve to mark the same apart from prior devices of this general character. It will further be readily recognized and appreciated that while the description of the present invention has been related to a specific embodiment of its concepts and teachings, that nevertheless the same is susceptible to change, modification and substitutions of equivalents, particularly the selection of indicated order periods, lead times and range of usage items per order period without departing from the spirit and scope of the invention. It is therefore intended that the present invention be unlimited by the foregoing description and illustrated embodiments thereof, except as may appear from the following appended claims.

I claim:

1. A calculating device for computing total quantities of items requisite to satisfy expected demand according to predetermined mathematical relationship of time and usage factors involved in replenishing inventory thereof under a predetermined periodic order system, comprising an elongated envelope member having a substantially opaque planar wall, an elongated table card member mounted substantially coextensively beneath said wall for sliding movement relative thereto, said wall having plural spaced order period areas defined thereon and within each said area an elongated indicia area extending substantially across the width of said wall and at which selected transversely extending portions of said table card member are visibly exposed, said wall also including an additional indicia area aligned substantially transversely of said elongated indicia areas and at which an additional selected lengthwise extending portion of said table card is visibly exposed; spaced index indicator means disposed adjacent said additional indicia area with each such indicator means being aligned opposite one of said elongated indicia areas, linear lead time scale means extending in cooperating adjacency along each of said elongated indicia areas and each such scale means comprising plural spaced index means designating selected lead time periods related to an associated order period designated by a related said order period area; said table card member having plural parallel spaced scale means designated thereon and oriented substantially transversely of said lead time scale means with one of said scale means on said table card member comprising plural indicia located along said lengthwise extending portion of said card member and designating usage quantities, the remaining said scale means of said table card member comprising a series of plural computed indicia designating total quantities required to meet expected usage for predetermined coverage time intervals consisting of the sum of selected order periods and lead time periods; portions of all of said remaining scale means being visibly exposed at each of said elongated indicia areas with each of the said index means of each lead time scale means being related only to predetermined scales of said scale means whereby movement of said table card member relative to said wall to dispose a selected indicia of said usage quantity scale means opposite one of said selected scale indicator means serves to align and visually present a computed total quantity indicia representing the number of items requisite to meet expected usage for a selected order period opposite each index means of the lead time scale means associated with the said elongated indicia area aligned opposite the said selected one index indicator means, with said total quantity indicia required to meet a selected coverage period being presented opposite a selected one of said lead time scale index means for said selected order period.

2. A manually operable calculating device for use in computing total quantities of items requisite to satisfy expected demand for predetermined coverage periods in a periodic inventory control order system and according to a predetermined mathematical relationship of item usage, lead time and order period factors of the order system comprising, envelope means having superposed coextensive front and back wall members, a table card member mounted between said wall members and adapted to be slidingly moved relative thereto, plural total quantity scale means designated on said table card member, usage scale means designated on said table card member and comprising selected numerical indicia representing quantities of items used during selected order periods, the several scale means on said table card member being disposed in spaced rows paralleling the axis of movement for said card member; plural spaced indicia area means formed on the walls of said envelope member with all but one of said area means extending transversely of the scale means on said card member and being adapted to make selected portions of all the plural total quantity scale means on the latter simultaneously visible to the operator in response to selected positioning of said card member relative to said envelope means, said one indicia area means being adapted to make selected portions of only said usage scale means visible to the operator; plural spaced index indicators disposed adjacent said one indicia area means, selected positioning of said table card member being effected by indexing a selected visible indicia of said usage scale means opposite a selected one of said index indicators and each of said index indicators being operatively associated with only one of the remaining indicia area means, while each of the latter is associated with a single order period; and lead-time scale means formed along each of said remaining indicia area means and each comprising plural spaced index means designating lead time periods related to only certain of said total quantity scale means and each index means designating a selected lead time period arithmetically associated with said single order period, the sum of a selected said lead time and order period determining a selected coverage period related only to said certain scale means whereby the desired total quantity of items requisite to satisfy demand for a selected coverage period is visually presented directly to the operator directly opposite the said selected lead time scale index means of the selected order period upon the selected positioning of said table card member.

3. A calculating device for computing quantities of items required to meet expected demand for a predetermined coverage period under a periodic order system comprising an elongated, generally rectangular shaped envelope member, open at its opposite ends and having superposed spaced planar front and back wall members integrally joined along their lateral margins, a planar table card member interposed between said front and back wall members, means affording manual engagement of said table card member whereby the same may be slidingly manipulated relative to and between said wall members, plural scale means designated on opposite faces of said card member, in spaced rows of numerical indicia paralleling the longitudinal axis of said envelope and card member, one of said scale means on each face of said card member comprising indicia representing quantities of items used or disposed of during selected order periods and the remaining of said scale means comprising numerical tabulations representing quantities of items required to meet demand during a predetermined future coverage time period; the latter period being the sum total of a selected order time period and a predetermined lead time period; indicia locating means formed in the said walls of said envelope for simultaneously visually presenting selected portions of all said scale means to the operator of the calculating device, plural spaced index means adjacent to and related with each of said indicia locating means; one of said indicia locating means providing visible portions of only the one scale means and the index means related thereto serving to determine selected positions for said table card member in accordance with the alignment of selected indicia of said one scale means therewith, and the said index means associated with the remaining said indicia locating means forming plural lead time scale means each of whch is associated with a single designated and predetermined order period having its index means associated with only certain selected of said plural scale means visible at each of said remaining indicia locating means whereby quantities of items required to meet expected demand during a predetermined coverage period are visually presented to the operator opposite a single selected index means of one of said lead time scale means in accordance with a single selected positioning of said table card member as determined by an order period.

4. The combination as set forth in claim 3 wherein each of the said scale means on opposite faces of said card member constitute related folded scale portions having one portion thereof appearing on one face of said card member and the remainder thereof on its opposite face, and said lead time scale means constitute disrupted scale means having plural portions thereof disposed in parallel spaced relation on both the said front and back wall members.

References Cited in the file of this patent
UNITED STATES PATENTS

| | | |
|---|---|---|
| 2,532,619 | Heerich | Dec. 5, 1950 |
| 2,689,685 | Giuntini | Sept. 21, 1954 |
| 2,794,597 | Maloof | June 4, 1957 |